May 7, 1963 H. KUMPF 3,088,902
ELECTRO-HYDRAULIC DRIVE FOR NUCLEAR-REACTOR CONTROL
Filed Feb. 12, 1960 2 Sheets-Sheet 1
FIG.1
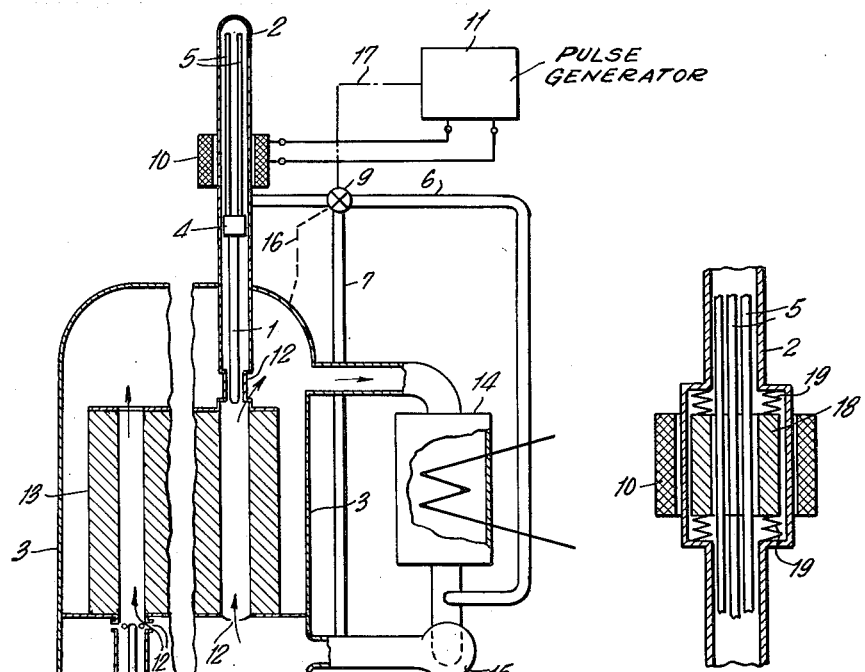
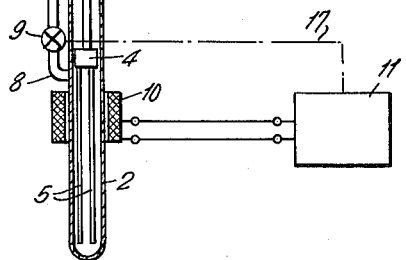
FIG.2

May 7, 1963  H. KUMPF  3,088,902
ELECTRO-HYDRAULIC DRIVE FOR NUCLEAR-REACTOR CONTROL
Filed Feb. 12, 1960  2 Sheets-Sheet 2

United States Patent Office 3,088,902
Patented May 7, 1963

3,088,902
ELECTRO-HYDRAULIC DRIVE FOR NUCLEAR-REACTOR CONTROL
Hermann Kumpf, Erlangen, Germany, assignor to Siemens-Schuckertwerke Aktiengesellschaft, Berlin-Siemensstadt and Erlangen, Germany
Filed Feb. 12, 1960, Ser. No. 8,405
Claims priority, application Germany Feb. 17, 1959
6 Claims. (Cl. 204—193.2)

My invention relates to an electro-hydraulic drive for the displacement of structure in hazardous or inaccessible locations, and in a more particular aspect to drives for lifting and lowering the control rods in nuclear reactors.

It is known to provide the control rod of nuclear fission reactors with electric, pneumatic or hydraulic drives or with drives of mixed type such as electro-hydraulic devices. In a known electro-hydraulic drive, the displacing force imparted to the vertically movable control rod is produced by electric motors which also control the speed of displacement. The hydraulic devices are actuated only when the reactor is to be shut down, in which case the neutron-absorbing rods are hydraulically run into the reactor core to prevent further nuclear fission.

With hydraulic control-rod drives, particular importance is placed upon a good fitting and a tight sealing of the driving components, particularly the hydraulic piston. Consequently, the driving components have always been designed with great precision.

Among the electric control-rod drives, a particular electromagnetic type, the so-called magnetic jack, has found preferred application. In a magnetic jack, a bunch or group of magnetizable metal rods coupled with the control rod is displaced longitudinally in consecutive steps by means of a magnetic field which periodically magnetizes the rods and thus deflects them into frictional stopping engagement with a tubular housing in which the bunch of rods is longitudinally displaceable. This incremental motion of the rod bunch is imparted to the control rod so that it is more or less immersed into or withdrawn from the correlated bore of the reactor core.

In comparison with other types of control-rod drives, particularly the magnetic jack, the advantage of a hydraulic drive mainly resides in the fact that it permits obtaining great speeds of displacement with relatively large masses. A disadvantage, however, is the precision mechanics required for such drives.

It is an object of my invention to provide a drive generally of the above-mentioned type in which the advantages of the hydraulic type are combined with those of the magnetic jack that a rugged electro-hydraulic drive suitable for large power requirements is available which affords a delicate control of the control rod or other structure to be displaced without requiring the use of high-precision components.

According to my invention, the control rod or other structure to be displaced longitudinally of the tubular housing which, in the case of a nuclear reactor extends to the vicinity or interior of the reactor core, is provided with a hydraulic piston displaceable in the tubular housing and is also equipped with an electromagnetically controllable assembly, preferably a bunch or group of metal rods as used in the magnetic jack to serve as a control member or escapement mechanism for varying the speed of displacement effected by the hydraulic drive. In such a device, the driving force is supplied hydraulically by means of the displaceable piston and hence can be designed for any desired force requirements, whereas the speed of the driving motion is electromagnetically controlled by subjecting the bunch of rods to the magnetic field of an electrically controlled magnetizing winding. By virtue of this separation between the functions ascribed to the hydraulic and electric means, the hydraulic components need not be provided with precision components, particularly the hydraulic piston need not be provided with a tight seal. The electromagnetic portion of the equipment can be given a design of considerably greater simplicity than required for a purely magnetically operating jack.

The invention will be further described with reference to the embodiment of a drive for nuclear-reactor control rods illustrated by way of example on the accompanying drawings in which:

FIG. 1 shows schematically a nuclear fission reactor provided with two types of control-rod drives according to the invention.

FIG. 2 is a sectional view of part of a modified electromagnetic portion in a drive otherwise corresponding to FIG. 1.

Figure 3:
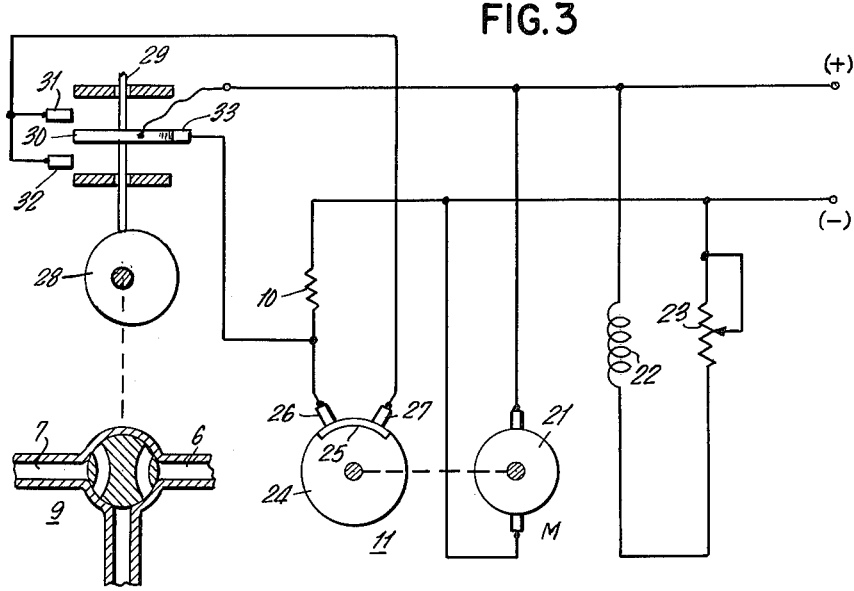
FIG. 3 is a schematic circuit diagram of an electric control system applicable with drives according to the invention.

In each of the two control-rod driving devices shown in FIG. 1, the control rod 1 is coaxially displaceable within a tubular elongated housing 2 which has one end closed and sealed whereas the other is open and is located within the reactor vessel 3 on which the housing 2 is mounted. Axially displaceable in each tubular housing 2 is a piston 4 which is joined with the control rod 1 and serves as a hydraulic driving member. Also secured to the piston 4 is a bunch of elongated metal rods 5 which are located between the piston and the sealed end of the housing 2. The rods consist of elastic magnetizable metal such as steel and, when magnetized, are laterally deflectable into frictional engagement with the wall of the tubular housing 2 for thereby impeding or stopping the driving motion of the piston assembly. The tubular housing 2 forms the hydraulic cylinder for the piston 4 and for this purpose is connected with hydraulic pressure lines 6, 7, 8 under control by a valve 9. Mounted on each tubular housing 2 is a magnetizing coil 10 which is connected with a control generator 11 capable of supplying an intermittent, alternating or otherwise pulsating current for periodically energizing the coil 10 which then magnetizes the bunch of rods 5 and thus enforces an incremental motion of the hydraulic piston core when the control valve 9 is set to supply displacing hydraulic pressure to the housing 2. Each of the tubular housings 2 protrudes into the interior of the reactor vessel 3 and is provided with a bore or passage 12 for the supply of coolant which flows through the reactor in the directions indicated by arrows. As shown in both embodiments of FIG. 1, the passage 12 is restricted around the control rod 1 at the entrance of the rod and passage into the reactor core 13, to thus provide a throttling effect or pressure drop in the coolant fluid flowing from piston 4 into the reactor. This coolant also serves as the hydraulic driving medium for the pistons 4. The coolant may consist of heavy water, for example. The moderator space 13 of the reactor core is shown only schematically and is indicated by diagonal cross hatching. Its cooling channels with the fissionable fuel elements are omitted for simplicity. Inserted into the coolant circulation system is a heat exchanger 14 and a circulation pump 15. As shown in FIG. 1, the high pressure line 7 is connected to the outlet side of pump 15 and the low pressure or negative pressure line 6 is connected to the inlet side of pump 15.

The control-rod driving device shown in the left-hand portion of FIG. 1 is located beneath the reactor vessel, whereas the device shown in the right-hand portion is located above the vessel. It will be understood that, in practice, only one of the two types of arrangement is being used for any one reactor.

In the control-rod driving device shown in the right-hand portion of FIG. 1, the upper side of piston 4 can be connected through the valve 9 selectively with the pressure line 7 of high pressure and with the line 6 of low or negative pressure so that the resulting pressure difference between the upper side and lower side of the piston 4 causes the piston to shift together with the control rod in the lowering or hoisting direction.

However, gravity may also be utilized for driving the control rod in the downward direction, as is exemplified by the driving device shown in the left-hand portion of FIG. 1. In this device only the lifting movement is supplied hydraulically. If desired, the above-described device shown in the right-hand portion may also be designed to permit lowering by gravity. For this purpose it is only necessary to substitute a pressure line schematically indicated at 16, which through valve 9 connects the upper side of piston 4 with the upper inside space of the reactor 3 instead of with the high pressure line 7.

The lines 6 and 7 of low and high pressure respectively can be connected, as shown, with corresponding pressure points of the coolant circulation system. If desired, however, a pressure container or accumulator independent of the reactor may be provided for hydraulic operation of the piston. Dependent upon the particular hydraulic system, the control valve 9 is a simple on-off valve, a three-way valve, or a slide valve which, for example during lowering of piston 4, directly connects the upper cylinder space 2 above the piston through line 16, indicated by a dash line in FIG. 1, with the reactor vessel 3 to equalize the pressure on both sides of piston 4 and thus to afford a more rapid lowering motion when gravity is used as the lowering force. In all cases, neither the piston 4 nor the valve 9 are required to have a perfect sealing. The fundamental speed of displacing motion can be varied within wide limits by correspondingly dimensioning and throttling the hydraulic lines.

The speed control proper as well as the arresting of the regulator rod 1 is effected by the magnetizing coil co-operating with the control generator 11. This generator energizes the control coil periodically with current pulses. When the pulse sequence is constant, the traveling speed of the control rod is likewise constant. When the pulse data (keying ratio) of the generator vary, the motion characteristic and speed of the control rod are varied accordingly.

For arresting the control rod, a holding current is superimposed upon the current pulses or is substituted for these pulses. The holding current must be so strong that it can permanently arrest the control rod in opposition to the action of the piston forces. Such arresting is aided by the friction of the rods 5 on the wall of housing 2. The valve 9 is preferably coupled with the control generator 11, as is indicated in FIG. 1 by the dot-and-dash line 17, so that when the valve is in closing or neutral position the holding current is supplied to the coil 10. When the valve is set to lifting or lowering position, the holding current is disconnected and the winding is then excited only by the periodic current pulses as described above.

In order to reduce the frictional travel of the rods 5 along the tubular wall, and hence to also reduce the frictional wear, a ring-shaped member 18 according to FIG. 2 is preferably disposed in the tubular housing 2. The ring member 18 is elastically mounted on springs 19. If desired, additional lifting and lowering windings, coaxially mounted above and below the coil 10, may be provided as are known as such from magnetic jacks and are described, for example, in my copending application Serial No. 859,803, filed December 15, 1959, now Patent No. 3,076,125.

The electro-hydraulic drive according to the invention is also applicable with flexible regulator rods or link-type rods consisting of individual absorber members articulately linked with each other. In reactor shut-down devices which are provided with ball-shaped absorber members, the lifting motion of the absorber balls can be controlled by means of the drive according to the invention. In this case a magnetizing winding, similar to coil 10, is applicable for forcing the balls magnetically against the corresponding shut-down (housing) wall in order to brake the movement of these balls.

The above-described operation of the pulse generator 11 and its connection with the hydraulic control valve will be further understood from the example schematically illustrated in FIG. 3. The winding 10 is supplied with pulses from the generator 11, which for simplicity, is shown to comprise a motor M driving an insulated disc 24 with a contact segment 25 for periodically closing a pulse circuit between stationary contacts 26 and 27. The frequency of the pulses can be adjusted by means of a speed regulator 23 which changes the voltage of the motor field winding 22. The valve 9 has three positions, namely a neutral position in which both pipes 6 and 7 are closed as shown, a position in which pipe 6 is connected with the tubular housing 2 (FIG. 1), and a position in which pipe 7 is connected with housing 2. The rotatable valve member is mechanically connected with an eccentric cam 28 for moving a tappet 29 between corresponding three positions.

In the illustrated neutral position of valve 9, a contact 30 of tappet 29 engages a stationary contact 33 and thereby applies a constant holding voltage to coil 10. When the valve 9 is in one of its two other positions, the tappet contact 30 is disconnected from contact 33 and instead engages a stationary contact 31 or 32. This disconnects the constant holding voltage and instead connects the pulse generator 11 to the winding 10.

Figure 4:
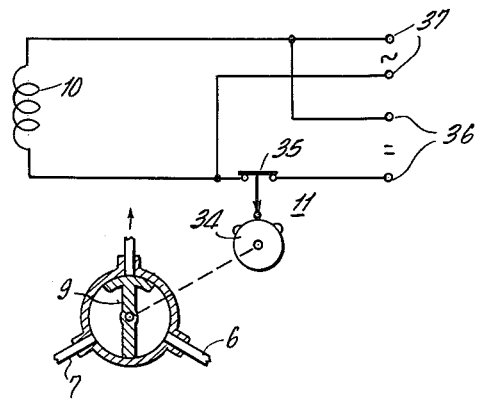
FIGS. 4 and 5 show two other electric circuit diagrams also for use with electro-hydraulic drives according to the invention.

In the embodiment of FIG. 4, the rotary member or valve 9 is connected with a cam 34 which opens a normally closed contact 35 only when the valve supplies hydraulic pressure to the housing of the device. When contact 35 is closed, a holding current is supplied from terminals 36 to the coil 10 in order to positively stop and arrest the control rod as described above. The holding current supplied through terminals 36 may be a constant direct current or an alternating current of normal line frequency such as 50 or 60 c.p.s. When a hydraulic displacement of the control rod is required, the line 6 or 7 is connected through valve 9 with the housing of the control rod. Simultaneously the contact 35 is opened thus interrupting the holding current. Thereafter only a current of comparatively very low frequency, for example 5 to 15 c.p.s. is supplied from terminals 37 to the coil 10 so that the control rod is speed-controlled in the above-described manner while traveling in the direction determined by the selected setting of the valve 9.

Figure 5:
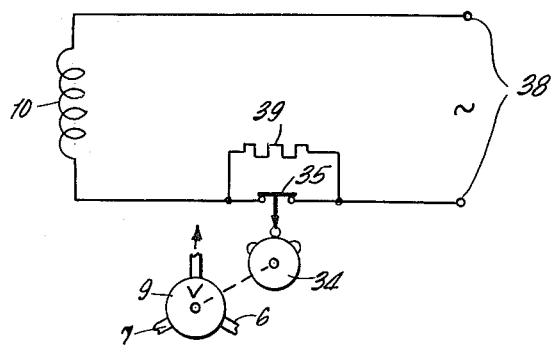

According to the modified circuit diagram shown in FIG. 5, a single alternating current whose frequency is between 10 and 20 c.p.s. is required. This alternating current is supplied to coil 10 through terminals 38 under control by a normally closed contact 35 which is actuated by a cam 34 under control by the hydraulic valve in the same manner as shown in FIG. 4. The contact 35 normally short-circuits a resistor 39. Under these conditions, i.e. when no hydraulic forces are active, the full alternating voltage is impressed upon the magnetizing coil 10 so that the control rod is continuously arrested. When the valve 9 is open toward one or the other side, the contact 35 also opens so that the voltage impressed upon the coil 10 is weakened by the resistor 36. As a result, the magnetic holding force passes periodically through a valve approximately equal to zero so that the magnetic field is no longer capable of continuously arresting the regulator rod in opposition to the hydraulic forces.

It will be obvious to those skilled in the art, upon studying this disclosure, that my invention permits of a great variety of modifications with respect to structural, hydraulic and electrical details and hence may be embodied in devices other than particularly illustrated and described herein, without departing from the essential features of my invention and within the scope of the claims annexed hereto.

I claim:

1. An electro-hydraulic drive for nuclear-reactor control, comprising a tubular housing, a source of hydraulic pressure connected to said housing, a piston hydraulically displaceable longitudinally in said housing, a structure longitudinally displaceable relative to said housing and joined with said piston to be driven thereby, said structure extending from said piston through one end of said housing, a bunch of flexible magnetizable rods also joined at one end of each rod with said piston and extending longitudinally in said housing, said rods being positioned so as to mutually repel each other and deflect when magnetized, said rods in deflected position being frictionally engageable with said housing, a magnetizing coil coaxially disposed on said housing for magnetizing said rods to deflect same, and pulsating current supply means connected with said coil for energizing said rod bunch into deflected position to thereby control the displacement speed of said structure.

2. An electro-hydraulic drive for displacement of structure in inaccessible locations, comprising an elongated tubular housing closed at one end and open at the other, a source of hydraulic pressure connected to said housing, a piston arranged for displacement longitudinally in said housing in at least in one direction hydraulically, displacement in the other direction being due at least partially to gravity, a structure longitudinally displaceable relative to said housing and extending from said piston toward said open end of said housing, brake means comprising a magnetizable armature assembly joined with said piston to be longitudinally displaced together therewith, said armature assembly having members arranged so as to be laterally deflectable when magnetized for frictional engagement with said housing to stop said piston, magnetizing coil means mounted outside said housing near the displacement path of said assembly, and current-supply means comprising a pulse generator connected with said coil means to energize the latter and thus actuate said brake means for escapement control of the piston displacement.

3. In an electro-hydraulic device according to claim 2, said source of hydraulic pressure comprising a high pressure side and a lower pressure side, said high pressure side of said source communicating with said open end of said housing, a high-pressure line connected to said outlet side of said pump, a pressure line of arithmetically lower pressure than said high pressure line and connected to the lower pressure side of said source, a third pressure line adapted to communicate with said high pressure and lower pressure lines to carry a pressure consisting substantially of the arithmetic sum of the pressures in said high pressure and lower pressure lines, and a selective control valve hydraulically joining said respective high and lower pressure lines with said third line, said third line being connected with said housing at a location between said closed end and said piston for selectively controlling said piston to move in one and the other direction respectively, due to respective pressure differences between the two piston sides.

4. In an electro-hydraulic device according to claim 2, said current-supply means comprising an additional source of current for continuously retaining said coil in energized condition, and circuit control means connecting said source of current to said coil means for maintaining said piston arrested.

5. In an electro-hydraulic device according to claim 2, said source of hydraulic pressure comprising two hydraulic lines and a selective control valve hydraulically connecting one of said two lines at a time to said housing for displacing said piston in a selected direction, said valve having a neutral position in which both said lines are hydraulically disconnected from said housing, said current-supply means comprising an additional source of current for continuously retaining said coil in energized condition, and circuit control means electrically connected with said source and joined with said valve so as to energize said coil means from said source of current when said valve is in said neutral position, whereby said position is kept arrested when said piston is hydraulically inactive.

6. An electro-hydraulic drive for control rods of a nuclear reactor wherein a fluid coolant is circulated through a passage in the reactor core, said drive comprising an elongated vertical housing having one end closed and having the other end open for communication with said passage in the reactor core, a reactor control rod longitudinally movable in said housing and through said open end between protruding and retracted positions relative to said housing, said reactor being provided with a coolant circulating system having zones of varying pressure hydraulic duct means having valve means selectively joining a predetermined pressure zone of said coolant circulating system with said housing, a hydraulic piston longitudinally displaceable in said housing by said coolant as hydraulic driving fluid and joined with said rod for displacing the latter, a bunch of magnetizable rods of elastically deflectable material joined with said piston in said housing at the piston side remote from said rod, said rods being positioned so as to mutually repel each other and deflect laterally when magnetized, said rods in deflected position being in frictional engagement with said housing, a magnetizing coil surrounding said housing near said rod bunch for magnetizing said rods to deflect same, and pulsating-current supply means of controllable frequency connected to said coil to energize the latter and thus pulsatingly deflect said rods for speed control of the hydraulic displacement.

References Cited in the file of this patent

UNITED STATES PATENTS 2,602,428     Randol  ------------------ July 8, 1952

OTHER REFERENCES

Nucleonics, vol. 13 (November 1955), pages 116, 118, 120, 122.

Schultz: Control of Nuclear Reactors and Power Plants, McGraw-Hill (1955), pages 100, 104, 105, 108–112.